No. 715,471. Patented Dec. 9, 1902.
F. R. FRENCH.
CONVEYING APPARATUS.
(Application filed Sept. 11, 1901.)

(No Model.) 5 Sheets—Sheet 1.

Witnesses,

Inventor,
Frederick R. French
By Dewey Strong & Co.
Atty

No. 715,471.  
F. R. FRENCH.  
CONVEYING APPARATUS.  
(Application filed Sept. 11, 1901.)

Patented Dec. 9, 1902.

(No Model.)

5 Sheets—Sheet 2.

Witnesses,

Inventor,
Frederick R. French

No. 715,471. Patented Dec. 9, 1902.
F. R. FRENCH.
CONVEYING APPARATUS.
(Application filed Sept. 11, 1901.)
(No Model.) 5 Sheets—Sheet 3.
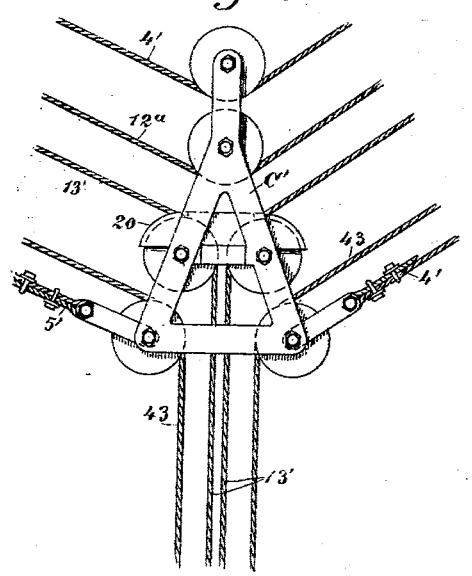
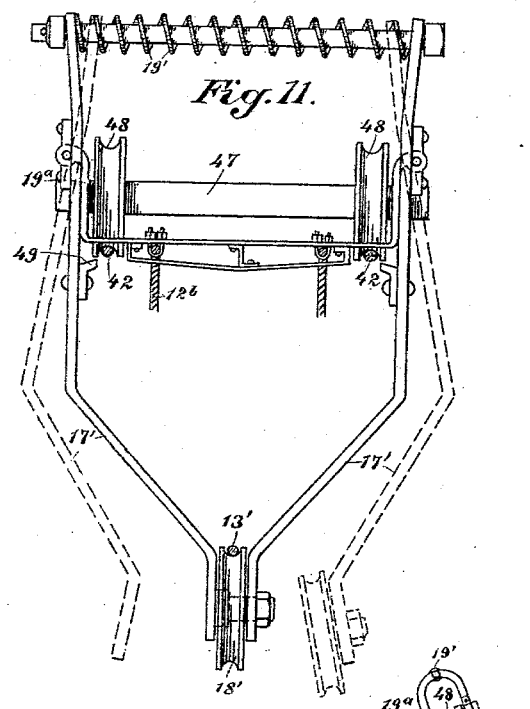
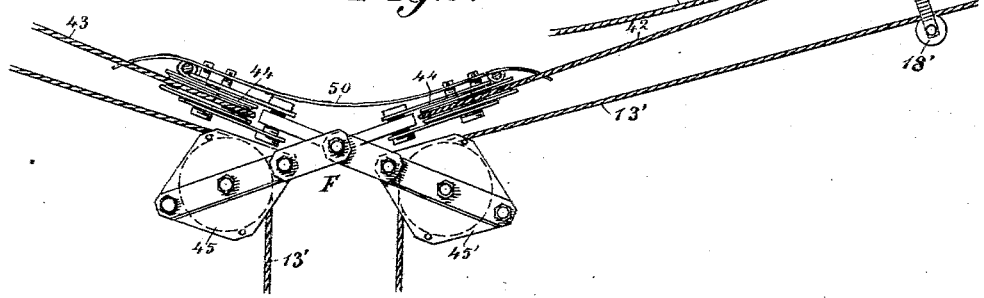
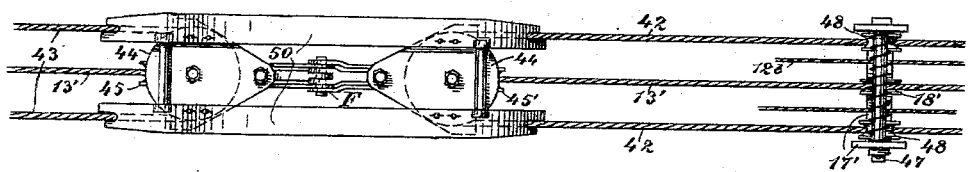

No. 715,471. Patented Dec. 9, 1902.
F. R. FRENCH.
CONVEYING APPARATUS.
(Application filed Sept. 11, 1901.)
(No Model.) 5 Sheets—Sheet 4.
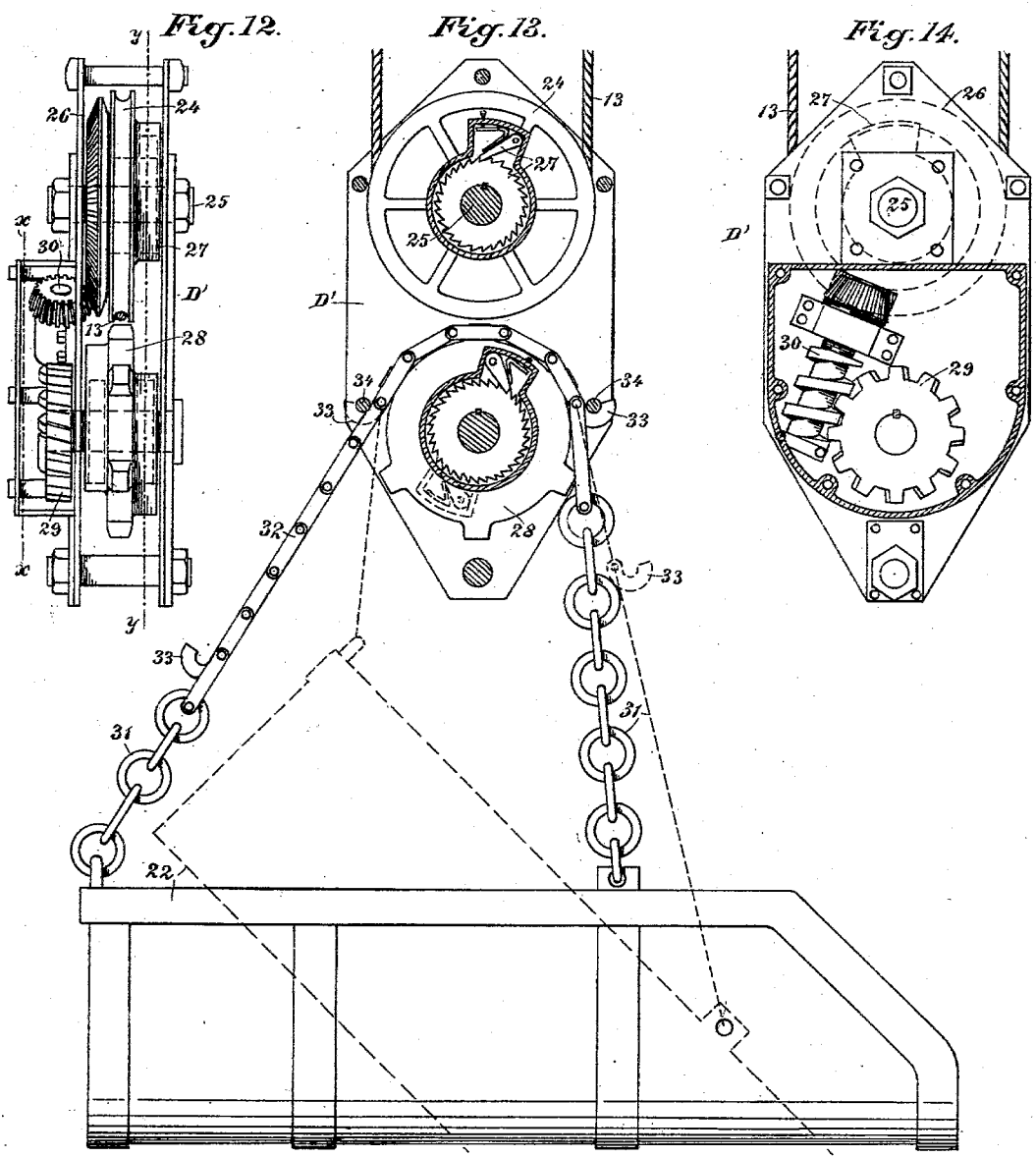
Witnesses,
Inventor,
Frederick R. French
By Dewey Strong
Atty No. 715,471. Patented Dec. 9, 1902.
F. R. FRENCH.
CONVEYING APPARATUS.
(Application filed Sept. 11, 1901.)
(No Model.) 5 Sheets—Sheet 5.

WITNESSES
C. H. Fowler
Howell Bartle

INVENTOR
Frederick R. French
by Dewey Strong & Co
his Attorneys

UNITED STATES PATENT OFFICE.

FREDERICK R. FRENCH, OF SAN FRANCISCO, CALIFORNIA.

CONVEYING APPARATUS.

SPECIFICATION forming part of Letters Patent No. 715,471, dated December 9, 1902.

Application filed September 11, 1901. Serial No. 75,067. (No model.)

*To all whom it may concern:*

Be it known that I, FREDERICK R. FRENCH, a citizen of the United States, residing in the city and county of San Francisco, State of California, have invented an Improvement in Conveying Apparatus; and I hereby declare the following to be a full, clear, and exact description of the same.

My invention relates to improvements in transportation systems whereby it is desired to convey by means of suspended cables a burden in either a longitudinal, transverse, or vertical direction in relation to a certain surface area.

It consists of suspended cables, a burden-carrier adapted to be supported upon and to be moved by said cables, independent fall-lines whereby the burden may be deposited or taken up at any point, means for supporting said fall-lines, and means for operating the lines and cables.

It also comprises an automatic discharging device and details which will be more fully explained hereinafter, having reference to the accompanying drawings, in which—

Figure 1:
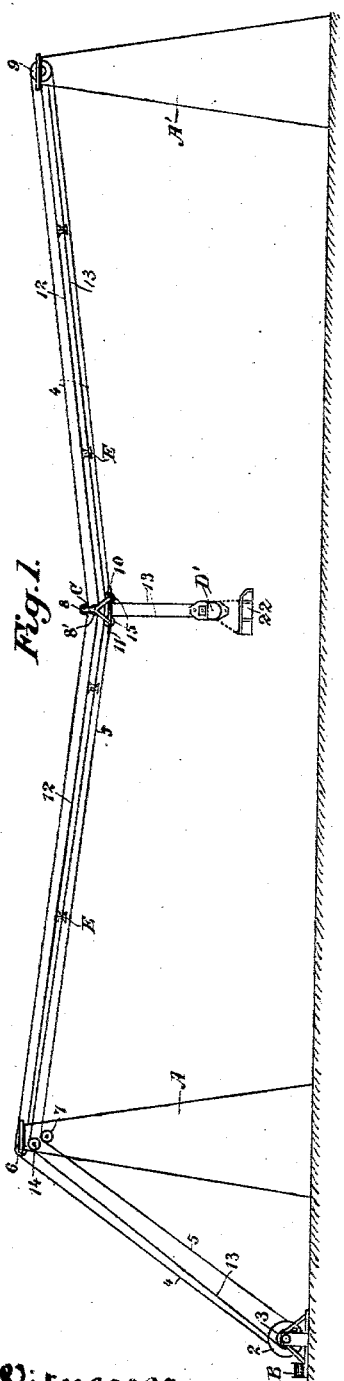
Figure 4:
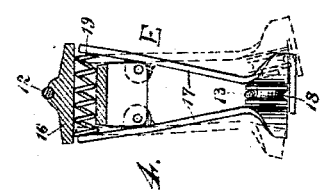
Figure 3:
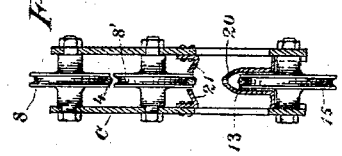
Figure 5:
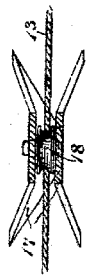
Figure 2:
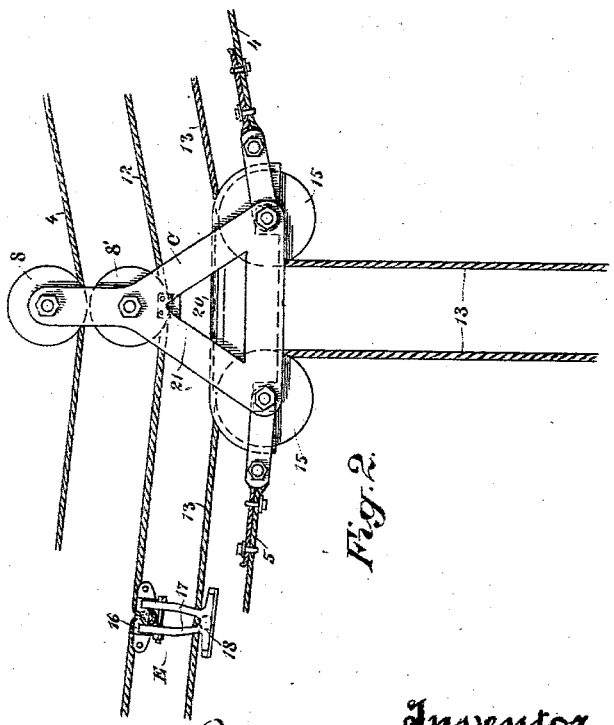
Figure 6:
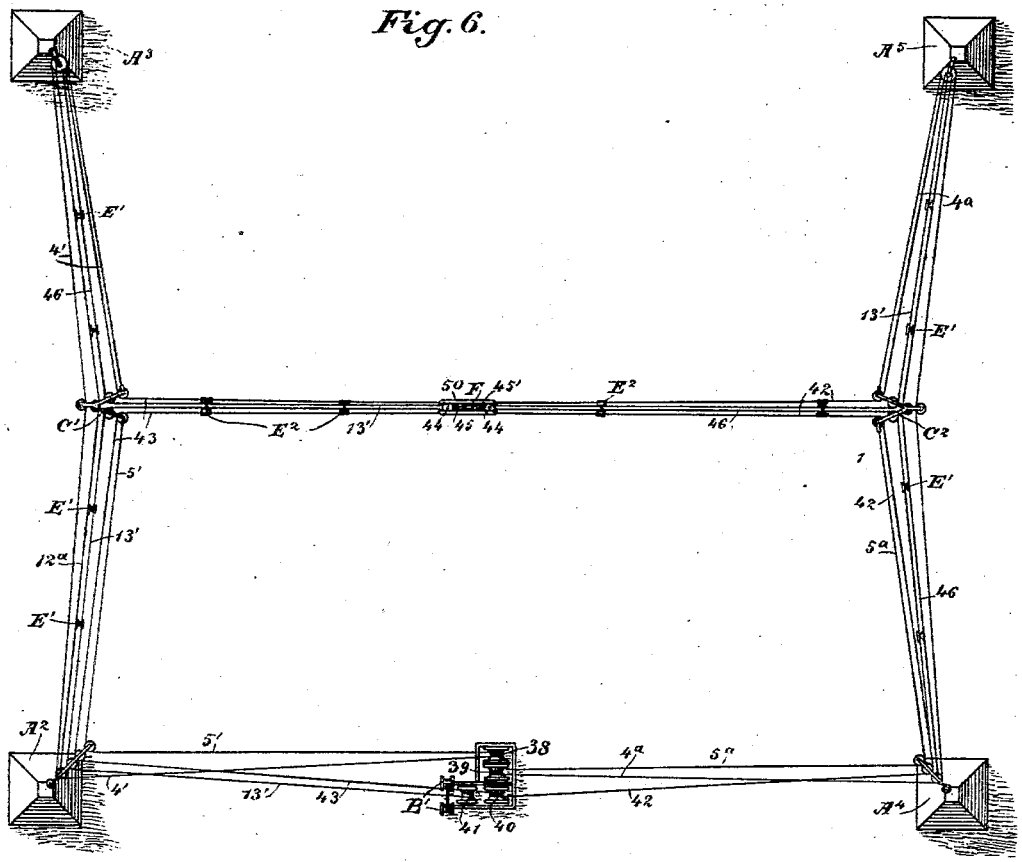
Figure 7:
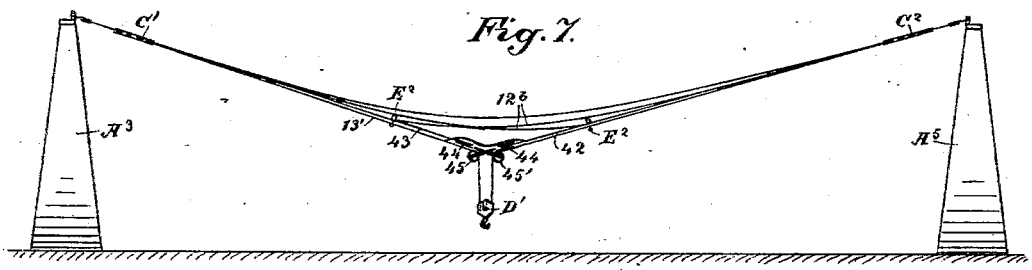
Figure 15:
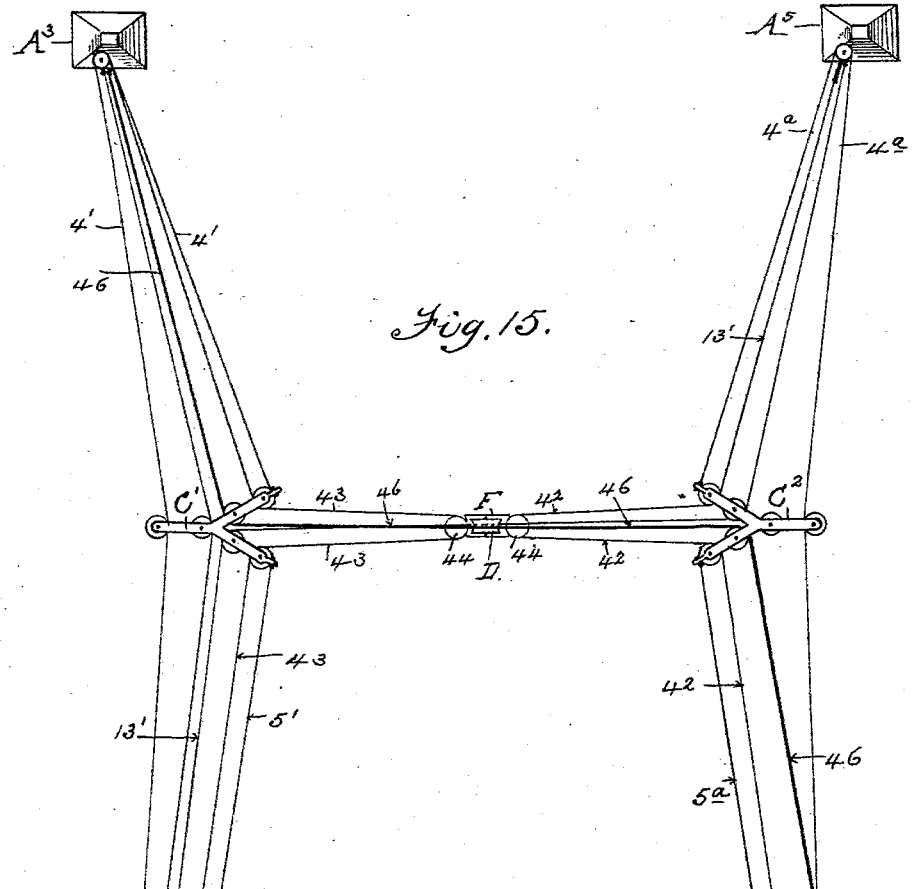
Figure 16:
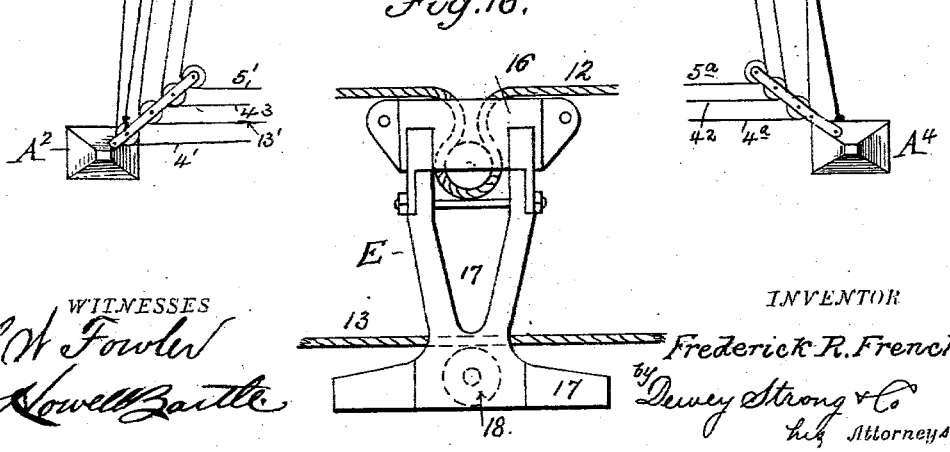

Figure 1 is a side elevation of a conveyer transporting only between two points. Fig. 2 is a side view of the trolley. Fig. 3 is an end view of the same. Fig. 4 is an end view, partially in section, of a fall-line carrier. Fig. 5 is a bottom view of the same. Fig. 6 is a plan view of a conveyer operating between four points. Fig. 7 is an end elevation of the same. Fig. 8 is a side view of its trolley-carrier. Fig. 9 is a side view of the respective trolley. Fig. 10 is a top view of the same. Fig. 11 is an end view of its fall-line carrier. Fig. 12 is an end view of the fall-block. Fig. 13 is a vertical section of the same on line $yy$, Fig. 12. Fig. 14 is a similar view on line $xx$, Fig. 12. Fig. 15 is a plan view substantially similar to Fig. 6 and showing more clearly the cable 46. Fig. 16 is an enlarged side view of a carrier E.

In my present invention I have shown two forms of conveying apparatus—one wherewith transportation in a longitudinal direction only is desired and one wherewith a burden may be carried either longitudinally or transversely over a certain superficial area. In both systems, however, I use an independent fall-line to raise or lower the burden, and this fall-line forms an important feature in my invention.

Fig. 1 represents a cable-way operating between two supports A and A'. B is an engine having a large drum 2 and a small drum 3, which drums are independently revoluble. The inhaul and outhaul cables are shown by 4 and 5, which pass from opposite sides of the drum 2 over respective sheaves 6 and 7 in the tower A. The former cable passes underneath the trolley-sheave 8, thence around a large sheave 9 in tower A', and attaches to the frame of the trolley C at 10. The cable 5 attaches to the frame on the opposite side at 11. The cables 4 and 5 may be either separate cables secured to the drum or consist of a single cable wound several times around the drum to prevent slipping. By means of these cables the load is transmitted in either direction along the line between the towers, the upper cable serving to support the load and also act as an outhaul-cable. Cable 5 is the "inhaul-cable," as it is termed, or cable which moves the load toward the engine. An auxiliary supporting-cable is shown at 12. This cable is stationary and is secured to the two towers and supports a second trolley-sheave 8'. To this cable are secured the fall-line carriers, which will be described later on. The raising, lowering, and dumping of the load is accomplished by means of the cable 13 or "fall-line," as it is termed, which has one end secured to the drum 3. From this drum it passes over a sheave 14 in the tower A, thence over the pulleys 15 in the trolley-carrier, and has its other end fastened to the tower A'. The fall-block D, carrying the burden, is supported on the cable 13 intermediate of the pulleys 15. The trolley C consists of a triangular frame carrying at its apex the sheave 8' and on its base the fall-line sheaves 15. The frame is provided with an upward extension, which carries the sheave 8, which latter rests upon the cable 4.

The operation of the cables would be as follows: To accomplish a motion in a horizontal direction, the large drum is revolved in a direction opposite to the line of desired travel, the small drum remaining stationary for the time being, whereby the burden remains at the same distance above the ground. The revolution of the large drum to the right, for example, causes the cable 4 to pay out and the cable 5 correspondingly to be wound up and the burden made to move to the left. To raise or lower the burden, the drum 3 is revolved either to take in or pay out the cable 13. It should be understood, however, that both movements may take place simultaneously, in which case the burden is moved diagonally. The fall-line carriers E, previously referred to, are, as the name designates, for the purpose of sustaining the fall-line in case of a light load or of no load at all and where the burden or fall-block may not be heavy enough to overhaul the fall-line and overcome the strain, as in the case where long spans occur. As the trolley C traverses the distance between the towers it is necessary that some provision be made for it to pass these fall-line carriers. This is afforded by the following construction, as shown in Fig. 4: A carrier consists, essentially, of a base portion 16, by which the device is secured fast to the supporting-cable 12. This base portion is represented in Figs. 2 and 4 as comprising two separable members, between which the cable is held in a bight and securely clamped thereto. By attaching the carrier in this manner the cable 12 preserves practically an unbroken line, so as to permit the trolley-sheave 8' to pass freely along the length of the cable. Arms 17 are pivoted on the base 16 and are movable on their pivots at right angles to the line of the cables. At the lower ends of the arms the roller or sheave 18 is carried, and the fall-line is supported on this sheave. One end of the shaft of the latter is secured firmly to one of the arms, and the other arm is provided with a socket, which is adapted to receive the other end of the shaft. The roller is free to turn on the shaft. The arms are normally held together at their lower ends by means of a spring 19. The edges of the lower part of the arms are made flaring, so as to permit the arms to be readily opened when the trolley approaches. The trolley C has a shield 20, which incloses the upper part of the sheaves 15, a narrow slot being left at each end for the passage of the fall-line. As the flaring arms 17 of the fall-line carrier are approached by the trolley C the shield 20 forces them apart and causes them to pass on either side of the shield and between the sides of the trolley-frame. The moment the shield has passed through or the trolley passed beyond the carrier the arms are closed by means of the spring 19, and the sheave 18 is once more in position to support the fall-line. Guards 21 upon the trolley-frame serve to deflect the cable 12 into the sheave 8' in case for any reason the shield should be displaced. As thus described this apparatus is capable of transporting burdens either in a horizontal line or in a vertical direction. Having transported the burden to or over a desired place, it is there necessary to discharge it. It is the purpose of my invention to effect this discharge automatically by means of the fall-line and devices to be hereinafter described.

In the foregoing I have described an apparatus for conveying loads between two points only. In Figs. 6 and 7 I have shown the same adapted to operate over a certain given area and in any desired plane. The engine B' is provided with four drums 38 39 40 41. The two drums 38 and 39 are revoluble in unison. The first carries the inhaul and outhaul cables 4' and 5', which operate the trolley-carrier C' upon one side of the system, and the second carries similar cables 4ª and 5ª, which operate the trolley-carrier C² on the other side of the system. The operation of these carriers is similar to that of the trolley C in Fig. 1 first described. To accomplish a movement in a direction transverse to the line of the cables 4' and 5', the drum 40 is revolved to wind up the cable 42 simultaneously with the unwinding of cable 43. The cable 42 leads from the under side of the drum 40, over a sheave in tower A⁴, around a sheave in trolley-carrier C², thence around a sheave 44 in the trolley F, returning through a second sheave in the trolley-carrier C², and thence to tower A⁵, where it is made fast. The cable 43 is disposed similarly on the other side of the system. The fall-line 13' is operated by the drum 41. This line leads from the drum over a sheave in the tower A², through the fall-rope carriers E', secured upon cables 12ª, extending between the towers A² A³, around a sheave in trolley C', through a second set of fall-rope carriers E², over a sheave 45 in the trolley F, thence through the fall-block D', returning around another sheave 45' in trolley F, thence through the trolley C² to tower A⁵, where it is made fast. Extending from tower A⁴, through the trolley-carriers C² and C' to tower A³ is a cable 46 (see Fig. 15) for the purpose of guiding the fall-rope carriers E' when the trolleys C' and C² approach them. The fall-line carriers E² are in principle similar to those described with reference to Figs. 4 and 5. When used in connection with the transversely-operating cables, they comprise a shaft 47, having two rollers 48, which rest on the two portions of either of the cables 42 and 43. They are held always in the same place in relation to each other and to the trolleys C' and C² by means of the spacing-cables 12ᵇ, which latter are fastened to the trolleys C' and C². The arms 17' of the carrier are pivoted to the ends of the frame 19ª. The lower ends of these arms carry a roller 18', similarly as in Fig. 4. A spring 19' keeps these arms normally closed. Guides, as 49, serve to keep the carrier in place upon the moving cables 42. The upper blocks of the trolley F carry flexible tracks 50 continuous with the lines of the cables 42 and 43, so that the trolley F may pass readily through the carriers as the trolley moves across the area. The tracks 50 are made broad and flaring, so that they will act as guides or as a shield to spread the arms and allow the blocks 44 and 45' to pass therebetween and at the same time serve as a support for the rollers 48. After the trolley F has passed through the carrier the arms close by reason of the spring 19' and the fall-line rests again on the roller 18'. The fall-block D' may be provided with an automatic unloading device, as hereinafter described. By means of this apparatus a burden may be picked up at any point within the area between the towers $A^2$ $A^3$ $A^4$ $A^5$ and transferred in any direction to any other point within the area and there deposited.

It is to be noted that the stationary cables 12, $12^a$, $12^b$, and 46 are principally used in connection with the fall-line carriers E E' $E^2$. It has been one of the chief objects in my invention to eliminate the feature of "standing" cables to support the weight, as is common in these systems.

In my system the cables that move the load also sustain it, and the use of the independent fall-lines is to obviate intricacy and allow flexibility in manipulation. It will, however, be understood that the independent fall-ropes and carriers as here described may also be used in conjunction with fixed or standing cables.

In order to dump or discharge a load at any desired point, I have shown an apparatus which is operated in conjunction with the fall-rope and the sheave 24, around which it passes. The sheave 24 is turnable about its shaft 25, and a bevel-gear 26 is loosely turnable on this same shaft. Between the adjacent faces of the sheave and frame is a ratchet-and-pawl mechanism 27, whereby the beveled gear-wheel 26 will revolve with the sheave when the latter turns in one direction and will remain stationary when the sheave turns in the other direction. A sprocket-wheel 28 is arranged in the block below the sheave 24, and its shaft carries at one end a gear-wheel 29. A worm-shaft 30 is adapted to transmit motion from the gear 26 to the gear 29. The load-containing pan 22 is hung upon the chains 31, so that the forward chains connect to the pan at points nearer the center of the pan, whereby the weight is thrown toward the rear and the tendency of the pan to tilt downwardly in front is counteracted. These chains join to a single chain 32, which passes over the sprocket-wheel 28. One of the links of the chain 32 is provided with a hook or projection 33, which is adapted to engage a stop 34 and prevent the pan tipping backward beyond a certain desired point.

In operation the pan is filled with material and the load lifted and moved to any desired point, the sheave 24 revolving freely in one direction when the load is raised or moved forward, because the pawl does not engage the ratchet. When it is desired to dump the load, it is only necessary to reverse the direction of revolution of the sheave 24, whereupon the gear 26 will be turned, causing the sprocket 28 to rotate in the direction of the front end of the pan, and the pawl engaging the ratchet turns with the sprocket and allows the chain to move, so as to tilt the pan and discharge its contents. The reversal of the direction of movement of the sheave 24 is effected simply by paying out the fall-line and allowing the load to descend a certain distance or by reversing its direction. It is thus seen that the act of discharge is a positive movement; but by reason of the pawl mechanism 27 and the peculiar manner of hanging the pan or bucket the latter will be automatically righted when lowered, so that the front strikes the ground where a new load is to be taken, the pawl allowing the ratchet on the sprocket-shaft to turn as the chain moves over it.

Having thus described my invention, what I claim as new, and desire to secure by Letters Patent, is—

1. The combination of a pair of trolley-carriers; traction-ropes connected therewith; means supporting said trolley-carriers and forming a trackway therefor; a trolley intermediate of the pair of trolley-carriers and suspended by and between the supporting means thereof; and a fall-line.

2. The combination of oppositely-located trolley-carriers; traction-ropes connected therewith; a trackway for each of said trolley-carriers; a trolley located between opposite trolley-carriers and suspended from the supporting means thereof; and a fall-line and actuating mechanism.

3. In a transportation system, the combination of supports or towers at the ends of the line, a rope fixedly suspended between said supports, inhaul and outhaul ropes and a winding mechanism connected therewith, a trolley suspended upon the outhaul-rope and having its opposite sides connecting with the ends of both hauling-ropes, said stationary rope also passing through the trolley, a fall-line passing through said trolley, and upon which a burden may be supported said fall-line having one end connected to one of the end supports, or towers, a winding mechanism connected to the other end of the fall-line, and means including carriers having gripping members to engage a bight of the stationary rope, for supporting the fall-rope therefrom.

4. In a transportation system, the combination of supports or towers at the ends of the line, a rope fixedly secured between said supports, inhaul and outhaul ropes and a winding mechanism therefor, a trolley suspended upon one of said hauling-ropes and having its opposite sides connected with the terminals of both ropes, a fall-rope passing through the trolley and having one end fixed and an intermediate portion forming a loop, from which a burden may be suspended, an operating mechanism for the other end of the fall-rope, and fall-rope-supporting devices pendent from the first-named stationary rope and suspending the fall-rope directly therefrom, said supporting devices clamping bights of the stationary rope whereby said rope preserves practically an unbroken line to permit the free passage of the trolley.

5. In a system of the character described, the combination of towers or supports at the terminals of the line, a member fixed to and suspended between said terminals, inhaul and outhaul ropes and operating mechanism for said hauling-ropes suspended between said terminals, a trolley connected to the hauling-ropes, a fall-rope from which the burden may be suspended said rope having one end fixed at one of the terminals, or end supports, and a mechanism to wind and unwind the opposite end of said fall-rope, and carriers clamped to bights formed in the said fixed suspended member whereby the fall-rope is supported at points in its length directly from the said fixed member.

6. The combination with hauling-ropes, end supports therefor, and a trolley, of a rope fixedly suspended between the said end supports, a fall-line extending between the end supports, having one end fixed, devices pendent from the fixed rope and clamping folded portions thereof and directly supporting the fall-rope at points in its length, and means for operating the hauling-ropes and fall-line.

7. In a transportation system, the combination of inhaul and outhaul cables, trolley-carriers with which said cables connect on opposite sides, supports for said cables, means for operating the cables in unison, an independently-operating fall-line passing through said trolley-carriers and having its portion which extends transverse to the area inclosed by said supports, adapted to sustain a burden, and means for horizontally supporting said fall-line.

8. The combination with inhaul and outhaul ropes, a trolley suspended therefrom, a fall-line extending through the trolley to opposite supports, and a burden-carrier suspended from the fall-line, of a fixed cable, carriers upon which the fall-line is supported, said carriers each having a clamp for the cable and said fixed cable having a bight formed in it adapted to be held between the clamps.

9. The combination with inhaul and outhaul ropes, a trolley suspended therefrom, a fall-line extending through the trolley and a burden-carrier suspended from the fall-line, of a fixed cable, carriers with sheaves upon which the fall-line is supported upon each side of the trolley, clamps and a bight formed in the stationary cable by which the cable and the carriers are secured together, and means by which the trolley may pass the carriers in either direction.

10. A transportation system consisting in the combination of sets of inhaul and outhaul cables, supports therefor, a trolley with which the cables of each set are connected, said cables adapted to operate in unison so that the trolleys are moved in a longitudinal and in the same direction, a burden-carrier located intermediate of said trolleys and movable in unison therewith, and an independent fall-line in connection therewith, and having its outer end fixedly secured.

11. The combination in a conveying apparatus of parallel traveling cables and supports, trolleys connected with the cables and movable outwardly or inwardly in unison, fall-ropes essentially parallel with the cables, sheaves upon the trolleys over which said ropes pass, and a burden suspended therefrom, and a supplemental fixed cable with carriers fixed thereto, and through which carriers the fall-rope passes.

12. The combination in a conveying apparatus of main traveling cables and supports therefor, a trolley movable by said traveling cable, a cable fixed between said end supports, a fall-rope and means carried by the fixed cable for suspending the fall-rope horizontally, means by which a burden is suspended and raised and lowered, and a centrally-balanced tilting mechanism between the fall-rope and the load whereby the load is discharged by the movements of the rope.

13. The combination in a conveying apparatus of main traveling cables, a trolley movable thereby, a fall-rope by which a load is suspended from the trolley, and means for discharging the load by the movements of the rope, said means consisting of a sheave around which the rope passes, a sprocket journaled in the same frame with the sheave, a chain passing around the sprocket and having its ends connected with the load-carrier, and connections whereby the rotation of the rope-sheave turns the chain-sprocket.

14. The combination with the fall-rope of a conveying apparatus, of a journaled sheave around which the rope passes, a sprocket journaled in the same frame, a load-carrier and chains connected therewith and passing over the sprocket, a worm-gear by which the sprocket is turned, a gear turnable upon the sheave-shaft and engaging a pinion upon the worm, and a pawl and ratchet by which transmission of movement in one direction is allowed.

15. The combination with the fall-rope of a conveying apparatus, of a sheave around which the rope passes, a gear upon the sheave-shaft, an interlocking device by which movement of the sheave is transmitted in one direction only, a chain and a load-carrier with which it is connected, a sprocket journaled with relation to the sheave over which sprocket the chain passes, a gear upon the sprocket-shaft, and interlocking mechanism by which movement in one direction is allowed, a worm engaging said gear, and a pinion on the worm-shaft engaged and turnable by the gear on the sheave-shaft.

In witness whereof I have hereunto set my hand.

FREDERICK R. FRENCH.

Witnesses:
S. H. NOURSE,
JESSIE C. BRODIE.